Nov. 29, 1960  E. METZMEIER ET AL  2,961,872
SHAFT ELONGATION AND FLEXURE MEASURING ARRANGEMENT
Filed Nov. 13, 1956  2 Sheets-Sheet 1

INVENTORS
Erwin Metzmeier and
Thomas Fritz
BY
Michael S. Striker
agt.

United States Patent Office 2,961,872
Patented Nov. 29, 1960

2,961,872

SHAFT ELONGATION AND FLEXURE MEASURING ARRANGEMENT

Erwin Metzmeier, Berlin-Wilmersdorf, and Thomas Friese, Berlin-Steglitz, Germany, assignors to Aktien-Gesellschaft "Weser," Bremen, Germany Filed Nov. 13, 1956, Ser. No. 621,709

Claims priority, application Germany Nov. 11, 1955

11 Claims. (Cl. 73—133)

The present invention relates to an apparatus for measuring the deformation of a rotating member. More particularly, the present invention relates to an apparatus for measuring the stresses and strains in rotating propeller shafts.

Hydraulic and electrical methods for measuring the static propeller thrust of propeller shafts by forming pressure layers are known. Attempts have also been made to measure the axial thrust of a rotating propeller shaft by means of a rod which is resting against the outer surface of the propeller. An optical indicating device is used to determine the deformation of the rod which is connected to the propeller shaft.

Such conventional devices have no practical value since the deformation of the propeller shaft depends a great deal on the temperature thereof. It is therefore necessary, in conventional arrangements, to arrange the temperature of the rod to be at the same level as the temperature of the propeller shaft. It is not possible with conventional methods to regulate the temperature level of the rod if the pressure with which the rod is maintained against the outer surface of the propeller shaft is very small. On the other hand when this pressure is large in order to obtain better heat transmission between the propeller shaft and the rod, the rod becomes deformed due to the frictional engagement of the rod and the shaft.

By means of the present invention it is possible to measure the static thrust as well as the thrust oscillations which are superimposed on the static thrust without encountering the difficulties of the conventional methods and apparatus.

It is accordingly an object of the present invention to provide an apparatus which overcomes the above described disadvantages of the prior art devices.

A second object of the present invention is to provide a new and improved apparatus for measuring the deformation of a rotating member.

Another object of the present invention is to provide an apparatus for measuring the axial thrust of a rotating propeller shaft.

Still another object of the present invention is to provide an apparatus for measuring the bending moment of a shaft without being influenced by the elongation of the shaft under load.

With the above objects in view the present invention mainly consists of an apparatus for measuring the deformation of a rotating member and including support means fixedly attached to the rotating member and rotatable therewith, signal producing means having a first element mounted on one of the support means and a second element movable with respect to the first element, the signal producing means producing an electrical signal proportional to the relative positions of the first and second elements, and at least one actuating rod member mounted on the support means at a predetermined distance from the rotating member and capable of responding to any deformation of the rotating member, in co-operation with the second element of the signal producing means, by changing the relative positions of the first and second elements an amount proportional to the deformation of the rotating member.

In a preferred embodiment of the present invention the support means are arranged in spaced relationship along the rotating member. The actuating means includes an actuating rod member which is fixedly mounted at one of its ends thereof on one of the spaced supporting means. The other end of the rod member cooperates with an element of the signal producing means which is mounted on another one of the spaced support means. Heat from the rotating member is transmitted to the spaced rod member by means of a fluid having good thermal conductivity characteristics and contained in an envelope forming a space between the rotating member and the rod and surrounding the latter so that the rod member is maintained at substantially the same temperature as the rotating member.

In still another preferred embodiment of the present invention, the signal producing means include one or more differential transmitters each of which is provided with a movable core that cooperates with one end of an actuating rod member. In this manner any change in position of or between the actuating rod member and the rotating member changes the position between the respective movable core and the remainder of the differential transmitter. The signal of the differential transmitter is therefore changed by the different position of the movable core thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
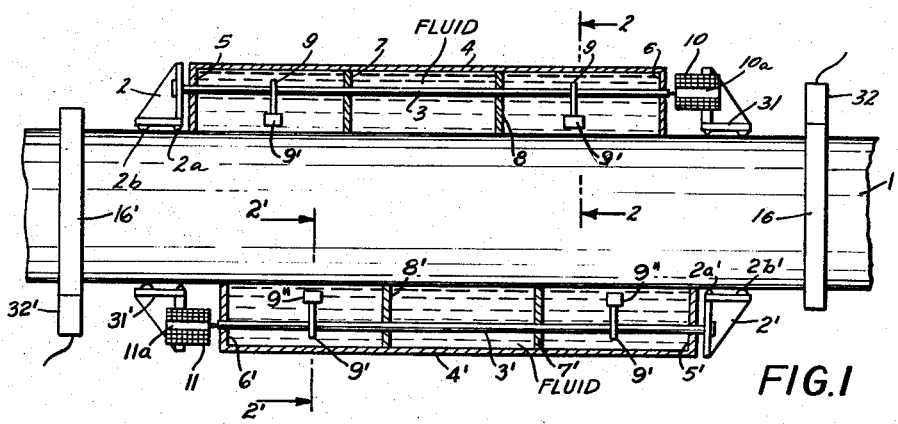
Fig. 1 is a side elevational view of the measuring apparatus arranged on the outer surface of the rotating propeller shaft.
Figure 2:
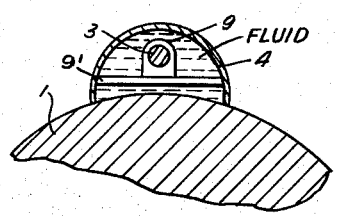
Fig. 2 is a sectional view taken along the line 2—2 of Fig. 1.

Referring to the drawings and more particularly to Figs. 1 and 2, it can be seen that the propeller shaft 1 is arranged for rotation on supporting means, not illustrated. Only a portion of the propeller shaft 1 is shown. It is rotatable about its turning axis (not shown). It should be appreciated however that the propeller shaft 1 is symmetrical about its axis.

At the left hand side of Fig. 1, atop the shaft, is shown a support member 2 which is fixedly mounted on the outer surface of the propeller shaft 1 and contacts the same by means of a pointed member 2a and a rounded member 2b. The member 2 is fixedly attached to the propeller shaft 1 by means of bands, not illustrated, which encircle the shaft. Mounted on the support member 2 is one end of an actuating rod member 3 which is connected at its other end to a core member 10a of a differential transformer 10 which is mounted on a second support member 31. The support member 31 is fixedly attached to the shaft 1 in the same manner as the support member 2.

Completely surrounding the actuating rod member 3 is an envelope 4 contacting the shaft 1 and having end portions 5 and 6 for hermetically or fluid tightly sealing the rod member 3 in a space surrounding the same and closed by a portion of the outer surface of the shaft 1. This can best be seen in Fig. 2.

In order to maintain the rod member 3 a fixed radial distance from the shaft 1, additional partitions 7 and 8 are provided for supporting the rod member 3 against any centrifugal forces set up by the rotation of the shaft 1. In place of the partitions 7 and 8 or in addition thereto, leaf springs 9 may be attached to the rod 3 as seen in Fig. 2 and provided with cross-pieces 9' which contact the sides of the envelope 4 for properly supporting the rod 3.

The actuating rod member 3 is fixedly mounted in the support member 2 so that it moves with the shaft 1 in the axial direction thereof whenever the shaft 1 is deformed. The right end of the rod member 3, however, and the movable core member 10a connected thereto are free to move within the differential transformer 10 which is fixedly mounted on the shaft 1.

Therefore, in operation, when the propeller shaft 1 is rotated, the spaced support means made up of the support members 2 and 31 will move in accordance with the deformation of the shaft 1. Any electrical signal produced by the differential transformer 10 will be dependent upon the position of the movable core 10a therein. Accordingly, if the propeller shaft 1 is elongated and the support members 2 and 31 are moved away from each other, the movable core 10a will be displaced to the left in Fig. 1 with respect to the differential transformer 10.

On the other hand if the propeller shaft 1 is compressed, the support members 2 and 31 will be moved towards each other and the movable core 10a will be displaced to the right. Any electrical signal produced by the differential transformer 10 will accordingly vary in proportion to the direction and amount of the relative movement between the movable core 10a and the differential transformer 10. In this manner, it is possible to measure the produced electrical signal and display the same to determine the propeller thrust.

In order to be sure that temperature differences do not affect the accuracy of the measurements, it is advantageous and desirable to construct the actuating rod member 3 of the same material as the propeller shaft 1 or of a material having the same or substantially the same temperature coefficient as the propeller shaft 1. The envelope 4 can then be filled with a fluid having good thermal conductivity characteristics. The fluid is introduced into the envelope 4 by port means which are not shown in order to avoid unnecessarily complicating the drawings.

With the above described arrangements, any change in temperature of the propeller shaft is transmitted to the rod member 3 so that any deformation which is due solely to such temperature change affects the rod member 3 in precisely the same manner. It can therefore be appreciated that the electrical signal produced by the differential transformer signal producing means is affected only by the relative position of the movable core 10a in the transformer 10 which in turn is affected only by an actual deformation of the propeller shaft 1.

For the purpose of transmitting the signals produced by the transformer 10 on the rotating shaft 1, there is also provided, as shown in Fig. 1, a slip ring 16 which is fixedly mounted on the shaft 1. This slip ring 16 makes electrical sliding contact with a fixedly mounted electrical brush 32. The slip ring is only one of five slip rings which are all mounted on the shaft 1 in the same manner. These slip rings are mounted by mounting a flexible plastic foil around the shaft 1. The extent of the plastic foil is approximately 8 millimeters less than the total circumference of the shaft 1. Five spaced annular conducting members are adhesively connected to the plastic foil to provide the five slip rings which are electrically insulated from each other by means of the plastic foil. The conductors between the slip rings and the differential transformer are arranged in the 8 millimeter space of the plastic foil.

Figure 3:
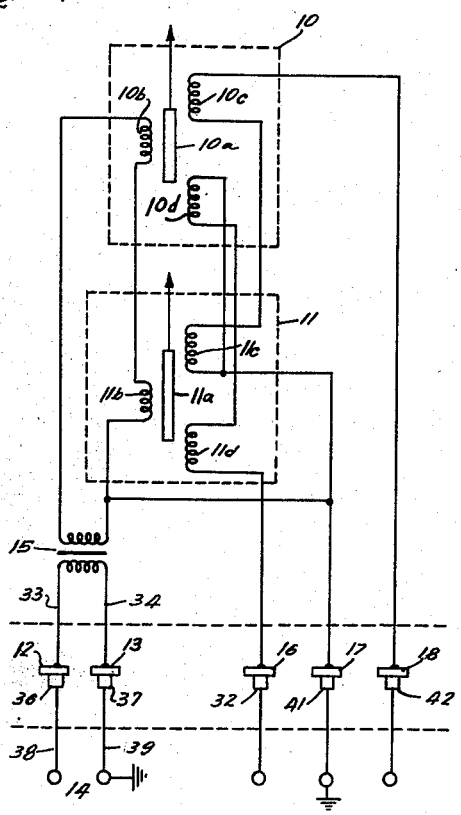
Fig. 3 is an electrical schematic diagram of the signal producing means used in the apparatus of Fig. 1.

Although only one of the measuring apparatus has been described above, it is clear that a second identical apparatus, as shown in Fig. 1, may be arranged on the other side of the shaft 1, diametrically opposite to the described first measuring arrangement. Identical parts have the same reference numerals but primed, as those of the first apparatus, except for the differential transformer 11 and its components. The electrical circuit for such an arrangement is shown in Fig. 3. The differential transformer 10 is shown having a primary winding 10b and two secondary windings 10c and 10d. The movable core 10a is arranged within the space surrounded by the primary and secondary windings and the output signal from the transformer 10 depends on the position of the core 10a with respect to the secondary coils 10c and 10d.

A second differential transformer 11 is shown in Fig. 3 having a primary winding 11b and secondary windings 11c and 11d. The transformer 11 has a movable core 11a which is connected to the second actuating rod member 3' on the opposite side of the shaft 1. The primary windings 10b and 11b are connected in series across the secondary winding of a transformer 15. The primary winding of the transformer 15 is connected by conductors 33 and 34 to slip rings 12 and 13. Making sliding electrical contact with the slip rings 12 and 13 are electrical brushes 36 and 37 respectively.

The brushes 36 and 37 are connected by means of conductors 38 and 39 respectively to the output terminals 14 of a carrier frequency generator. The transformer 15 is provided in order to make the slip ring circuit with a high impedance input so that a high voltage may be used to reduce the effect of variations in the contact resistance between the brushes and the slip rings to a minimum.

In operation, upon movement of both of the actuating rod members 3, 3' the movable cores 10a and 11a of the differential transformers, coupled thereto, will be moved to make the coupling between the primary windings 11b and 10b respectively and the secondary windings 11c and 10c respectively greater while making the coupling between the primary windings 10b and 11b and the secondary windings 10d and 11d, respectively, smaller.

The two differential transformers 10 and 11 have equal mechanical and electrical characteristics. The secondary windings 10c and 11c are connected in series and the secondary windings 10d and 11d are connected in series. In this manner, only the elongation of the shaft is measured and not the bending thereof since only the sum of the elongation at opposite sides of the shaft is measured. The electrical signal output from the two secondary circuits is connected to the three slip rings 16, 17 and 18 which make electrical sliding contact respectively with electrical brushes 32, 41 and 42.

With the above indicated arrangement, it is clear that the output signals from the differential transformers will be proportional to the amount of elongation of the propeller shaft 1.

Figure 4:
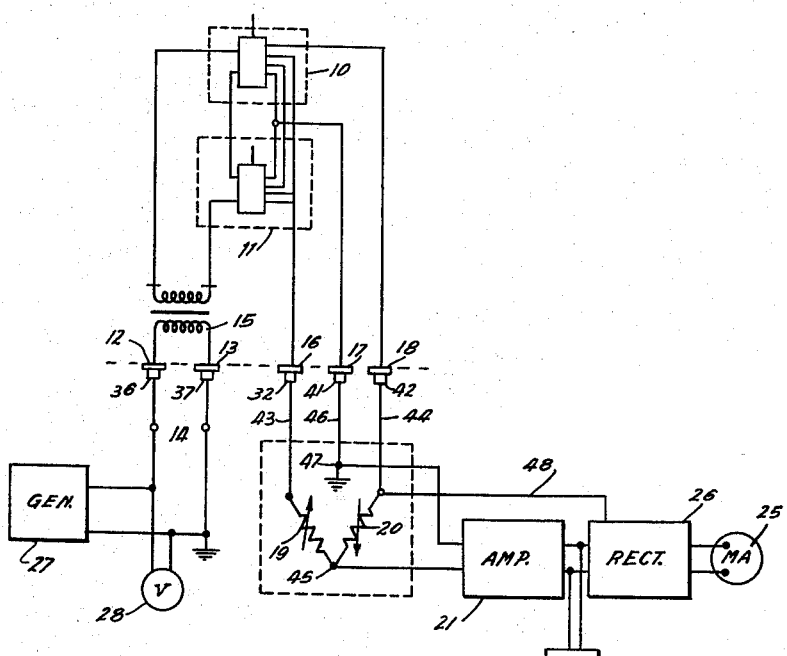
Fig. 4 is an electrical schematic diagram showing the measuring circuit connected to the signal producing means of Fig. 3.

Referring now to Fig. 4 the measuring and indicating circuit of the present invention will be described. It can be seen that the brush 32 is connected by conductor 43 to one side of an adjustable resistor 19 and the brush 42 is connected by a conductor 44 to one side of an adjustable resistor 20. The other sides of the resistors 19 and 20 are connected together to an ouput terminal 45. The brush 41 is connected by a conductor 46 to an electrically grounded output terminal 47. The resistors 19 and 20 and the series connected secondary windings of the differential transformers 10 and 11 form a Wheatstone bridge with the output of the secondary coils being connected to the input of the Wheatstone bridge arrangement and the terminals 45 and 47 being the output terminals of the Wheatstone bridge arrangement.

Connected to the terminals 45 and 47 is an amplifier 21 whose output is connected to a rectifier 26 and a second amplifier 22. The output of the second amplifier 22 is connected to the vertical deflection plates of an oscilloscope 23 having a cathode ray tube for displaying the electrical signals applied to the deflection plates thereof. A camera 24 is provided for recording the electrical signals displayed on the cathode ray tube of the oscilloscope 23. Connected to the output of the rectifier 26 is a milliammeter 25. The rectifier 26 is also connected by a conductor 48 to one of the input terminals of the Wheatstone bridge arrangement.

As indicated in Fig. 4, a carrier frequency generator 27 is connected to the input terminals 14 which in turn are connected to the brushes 36 and 37. The output of the generator 27 is measured by the voltmeter 28.

In operation the displacement of the movable cores 10a and 11a of the differential transformers 10 and 11, respectively, produce a difference voltage in the Wheatstone bridge arrangement which is proportional to the sum of the elongations of the propeller shaft 1. This difference voltage is amplified in the amplifiers 21 and 22 and applied to the cathode ray oscilloscope 23 and displayed on the screen thereof. The screen of the cathode ray oscilloscope is photographed by the camera 24 in a known manner to provide a record of the deformational forces to which the propeller shaft is subjected during rotation thereof.

The carrier frequency is provided by the carrier frequency generator 27, the amplitude of which may be regulated according to the indications of the voltmeter 28.

The apparatus can be used also for indicating purely the bending of the shaft without being influenced by the shaft elongation. For this purpose the secondary coil 10c of the transformer 10 is connected in series with the secondary coil 11d of the transformer 11 and the secondary coil 11c of the transformer 11 is connected in series with the secondary coil 10d of the transformer 10. In this manner it is not necessary to make any corrections for differences in temperature between the propeller shaft and the measuring device.

It will be understood that each of the elements described above, or two or more together, may also find a useful application in other types of measuring arrangements differing from the types described above.

While the invention has been illustrated and described as embodied in a measuring arrangement for measuring deformation of a rotating member, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for measuring the deformation of a rotating member comprising, in combination, axially spaced support means fixedly attached to said rotating member and rotatable therewith; signal producing means having a first element mounted on one of said support means and a second element movable with respect to said first element, said signal producing means producing an electrical signal proportional to the relative positions of said first and second elements; at least one actuating rod member having one end thereof fixedly attached to the other one of said spaced supporting means and the other end cooperating with said second element of said signal producing means, said actuating rod member being spaced a predetermined distance from said rotating member and capable of responding to any deformation of said rotating member by changing the relative positions of said first and second elements an amount proportional to such deformation of the rotating member, and said actuating rod member being made out of material which has substantially the same coefficient of thermal expansion as said rotating member; and enclosure means surrounding said actuating rod member and held tightly contacting said rotating member, a fluid of good thermal conductivity at least partly filling said enclosure means so as to be simultaneously in contact with said actuating rod member and with at least a portion of said rotating member for maintaining said actuating rod member at substantially the same temperature as that of said rotating member.

2. Apparatus for measuring the deformation of a rotating member comprising, in combination, axially spaced support means fixedly attached to said rotating member and rotatable therewith; signal producing means having a first element mounted on one of said support means and a second element movable with respect to said first element, said signal producing means producing an electrical signal proportional to the relative positions of said first and second elements; at least one actuating rod member having one end thereof fixedly attached to the other one of said spaced supporting means and the other end cooperating with said second element of said signal producing means, said actuating rod member being spaced a predetermined distance from said rotating member and responsive to any deformation of said rotating member by changing the relative positions of said first and second elements an amount proportional to the deformation of the rotating member; means for fluid tightly sealing said actuating rod member and said space between said rod member and said surface portion of said rotating member; and a fluid of high thermal conductivity arranged in said sealing means and extending between said surface portion of said rotating member and said actuating rod member for maintaining said rod member at the same temperature as said rotating member.

3. Apparatus as claimed in claim 2 wherein mounting means are provided for maintaining said actuating rod member a fixed radial distance from said rotating member.

4. Apparatus as claimed in claim 1 wherein said signal producing means includes a differential transformer having the coils thereof mounted on said support means and having a movable core element cooperating with said actuating means.

5. Apparatus as claimed in claim 1 wherein two sets of said spaced support means are arranged on diametrically opposite portions of said rotating member, each of said sets of support means having a respective signal producing means and actuating means mounted thereon.

6. Apparatus as claimed in claim 5 wherein each of said signal producing means is a differential transformer having respective movable core elements therein cooperating with their respective actuating rod members, said differential transformers each having a primary winding and a plurality of secondary windings.

7. Apparatus as claimed in claim 6 wherein one secondary winding of each of said differential transformers is connected in series with a secondary winding of another of said differential transformers.

8. Apparatus for measuring the deformation of a rotating member comprising, in combination, at least one set of axially spaced support means fixedly attached to said rotating member and rotatable therewith; signal producing means associated with said set of support means and having a first element mounted on one of said support means and a second element movable with respect to said first element, said signal producing means producing an electrical signal proportional to the relative positions of said first and second elements; actuating means associated with said set of support means and mounted on another one of said support means and responsive to any deformation of said rotating member and cooperating with said second element of said signal producing means by changing the relative positions of said first and second elements an amount proportional to the deformation of the rotating member; enclosure means surrounding said actuating rod member and held tightly contacting said rotating member, a fluid of good thermal conductivity at least partly filling said enclosure means so as to be simultaneously in contact with said actuating rod member and with at least a portion of said rotating member for maintaining said actuating rod member at substantially the same temperature as that of said rotating member; and indicating means connected in circuit with said signal producing means for indicating the electrical signals produced by said signal producing means.

9. Apparatus as claimed in claim 8 wherein said indicating means includes a Wheatstone bridge arrangement for having an input connected in circuit with said electrical signal produced by said signal producing means and an output, an amplifier connected to the output of said Wheatstone bridge arrangement for amplifying any signal emitted from said Wheatstone bridge, and a cathode ray oscilloscope responsive to the amplified signals emitted from said amplifier for displaying the same.

10. Apparatus as claimed in claim 9 wherein a rectifier is also connected to the output of said amplifier for rectifying the amplified signal and an indicating meter is provided for displaying the rectified signal.

11. Apparatus as claimed in claim 1 wherein slip rings are mounted on said rotating member for rotation therewith and a plurality of electrical brushes are fixedly mounted adjacent said slip rings for making sliding electrical contact with said slip rings, said slip rings being connected in circuit with said signal producing means for transmitting said electrical signals produced thereby to said electrical brushes.

References Cited in the file of this patent

UNITED STATES PATENTS

| | | |
|---|---|---|
| 2,183,078 | Kemler | Dec. 12, 1939 |
| 2,359,125 | Langer et al. | Sept. 26, 1944 |
| 2,530,022 | Mershon | Nov. 14, 1950 |
| 2,545,650 | Chudyk | Mar. 20, 1951 |
| 2,553,833 | Rifenbergh | May 22, 1951 |
| 2,566,566 | Howes | Sept. 4, 1951 |
| 2,700,896 | Root | Feb. 1, 1955 |

FOREIGN PATENTS

| | | |
|---|---|---|
| 215,986 | Great Britain | May 22, 1924 |